US009648847B2

(12) United States Patent
Coleman

(10) Patent No.: US 9,648,847 B2
(45) Date of Patent: May 16, 2017

(54) ELECTRIC FENCE FOR ZONE BREAKS

(71) Applicant: Bryan Coleman, Howard, CO (US)

(72) Inventor: Bryan Coleman, Howard, CO (US)

( * ) Notice: Subject to any disclaimer, the term of this patent is extended or adjusted under 35 U.S.C. 154(b) by 0 days.

(21) Appl. No.: 14/886,331

(22) Filed: Oct. 19, 2015

(65) Prior Publication Data

US 2016/0270366 A1 Sep. 22, 2016

Related U.S. Application Data

(60) Provisional application No. 62/134,070, filed on Mar. 17, 2015.

(51) Int. Cl.

*A01K 3/00* (2006.01)
*E04H 17/02* (2006.01)
*H05C 1/02* (2006.01)

(52) U.S. Cl.

CPC ............. *A01K 3/005* (2013.01); *E04H 17/02* (2013.01); *H05C 1/02* (2013.01)

(58) Field of Classification Search

CPC ..... E04H 17/10; E04H 17/266; E04H 17/145; H05C 1/02

See application file for complete search history.

(56) References Cited

U.S. PATENT DOCUMENTS 2,530,247 A * 11/1950 Koonz ................. H01B 17/145 174/158 F
3,747,897 A * 7/1973 Conley .................. A01K 3/005 119/63
4,155,083 A * 5/1979 Slaats .................. G08B 13/122 174/102 R
4,196,890 A * 4/1980 Einhorn ............... G08B 13/122 256/10
4,318,088 A * 3/1982 Hunter ................. G08B 13/122 174/158 F
4,367,459 A * 1/1983 Amir .................... G08B 13/122 200/61.93
4,527,150 A * 7/1985 Porat .................... G08B 13/122 340/541
4,533,906 A * 8/1985 Amir .................... G08B 13/122 200/61.93
4,730,809 A * 3/1988 Stoler ..................... E04H 17/24 200/61.93
4,796,338 A 1/1989 Meyers (Continued)

OTHER PUBLICATIONS

Advanced Perimeter Systems Limited, "APS Perimeter Security Systems", 3 pages, available on the Internet at www.apsltd.net at least as early as (downloaded on) Apr. 29, 2015.

*Primary Examiner* — Daniel Wiley
(74) *Attorney, Agent, or Firm* — Trenner Law Firm, LLC; Mark D. Trenner

(57) ABSTRACT

An electric fence for zone breaks is disclosed. An example electric fence for zone breaks includes a first support member having at least one attachment, and a second support member having at least one corresponding attachment. At least one wire is connected to the at least one attachment and the at least one corresponding attachment. The at least one wire extends between the first support member and the second support member to cover a zone break. An electrical connection provides electrical current to the at least one wire to protect non-electrified portions of an electric security fence.

20 Claims, 10 Drawing Sheets

(56) References Cited

U.S. PATENT DOCUMENTS

| | | | | | |
|---|---|---|---|---|---|
| 4,829,287 | A * | 5/1989 | Kerr | G08B 13/122 | 340/541 |
| 4,973,029 | A * | 11/1990 | Robbins, III | A01K 3/005 | 174/120 SC |
| 5,036,166 | A | 7/1991 | Monopoli | | |
| 5,738,341 | A * | 4/1998 | Lease | A01K 3/005 | 256/10 |
| 5,852,402 | A * | 12/1998 | Perry | E04H 17/10 | 256/10 |
| 5,992,828 | A | 11/1999 | Burdick | | |
| 6,036,175 | A * | 3/2000 | Harper | A01K 3/005 | 256/1 |
| 6,173,942 | B1 | 1/2001 | Weinreich et al. | | |
| 6,209,853 | B1 * | 4/2001 | Roy | A01K 3/005 | 174/158 F |
| 6,646,551 | B2 | 11/2003 | Perry | | |
| 2014/0246638 | A1 * | 9/2014 | Anson | E04H 17/10 | 256/37 |

* cited by examiner

ELECTRIC FENCE FOR ZONE BREAKS

PRIORITY CLAIM

This application claims the priority benefit of U.S. Provisional Patent Application No. 62/134,070 filed Mar. 17, 2015 for "Anti-Climb Fence" of Bryan Coleman, hereby incorporated by reference in its entirety as though fully set forth herein.

BACKGROUND

Fences are used to keep people and/or animals outside of an area (e.g., to keep children out of unsafe areas such as power plants) or within a contained area (e.g., prisoners in a prison yard). The more secure areas will often employ barbed wire, and may even include electrified fence. However, most electrified fences can still be compromised, e.g., near the fence posts.

DETAILED DESCRIPTION

An electric fence for zone breaks (or "anti-climb" fence) is disclosed herein which electrifies and secures the entire fence area, even zone breaks on an electric security fence. An example electric fence for zone breaks (e.g., those caused by a fence post or other non-electrified portion of the fence) includes a first support member having at least one attachment, and a second support member having at least one corresponding attachment. At least one wire is connected to the at least one attachment and the at least one corresponding attachment. The at least one wire extends between the first support member and the second support member to cover a zone break. An electrical connection provides electrical current to the at least one wire to protect non-electrified portions of an electric security fence, thereby reducing compromising the electric security fence at vulnerable portions.

In an example, the electric fence for zone breaks reduces or altogether prevents the possibility of the fence being compromised (e.g., by climbing) at the zone breaks. The electric fence for zone breaks may also reduce or altogether prevent the fence from electrically shorting (e.g., during harsh weather).

Before continuing, it is noted that as used herein, the terms "includes" and "including" mean, but is not limited to, "includes" or "including" and "includes at least" or "including at least." The term "based on" means "based on" and "based at least in part on."

Figure 1:
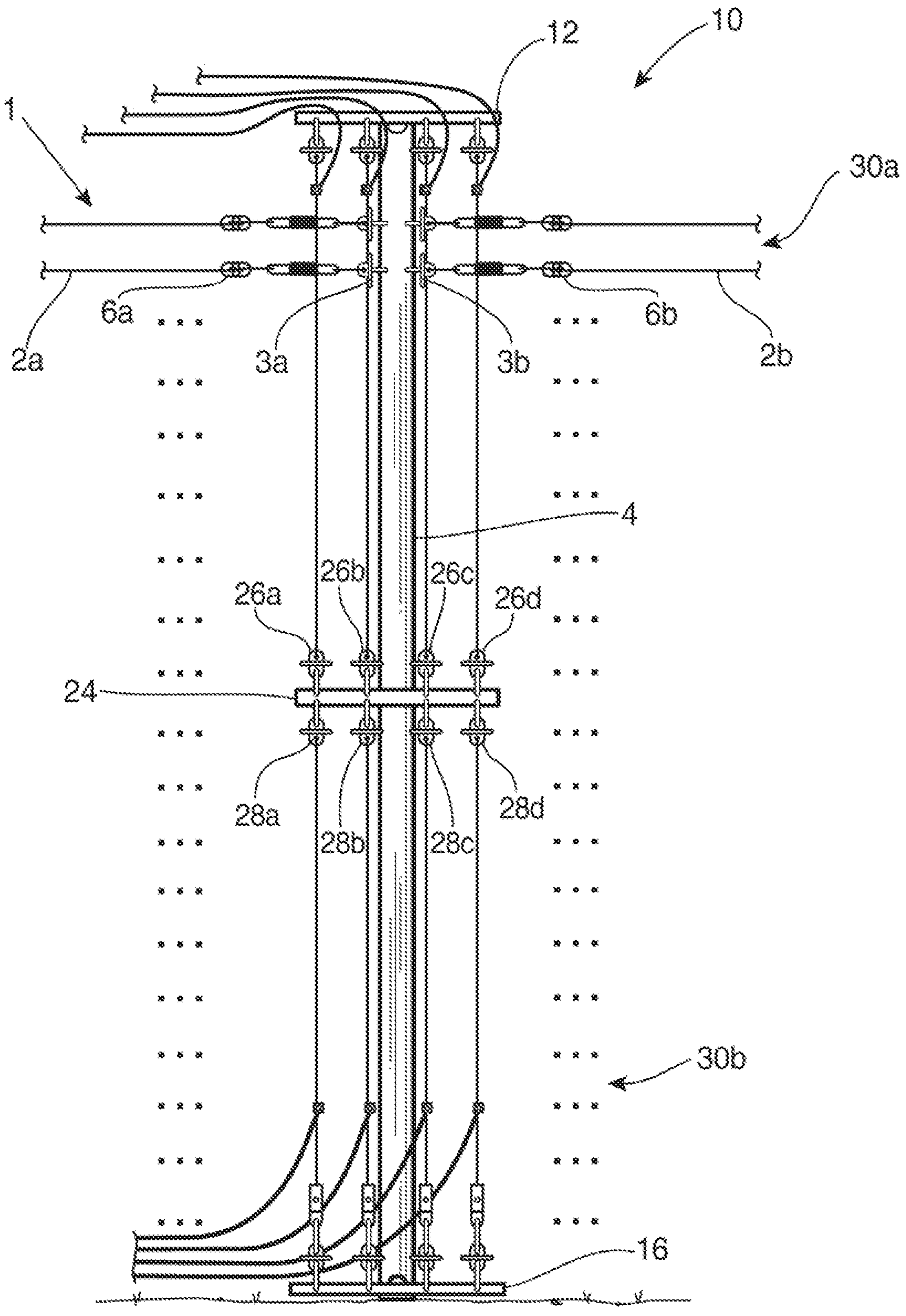
FIG. 1 shows an example electric fence as it may be deployed at zone breaks.

FIG. 1 shows an example electric fence 10 as it may be deployed at zone breaks. By way of illustration, an electrified fence 1 may include electric current-carrying wires 2*a-b* connected at attachment points 3*a-b* on opposite sides of a fence post 4. The dots 5 shown in the drawing represent a plurality of electric current-carrying wires (not shown to simplify the drawing), from ground level to the top of the fence. However, the electrified portion stops at a connection 6*a* prior to the attachment point 3*a*, and starts again on the opposite side of the fence post 4 at connection 6*b* to the next wire 2*b*. This space between connection 6*a* and connection 6*b* is referred to herein as a zone break. That is, the electrified fence 1 does not cover the fence post 4 and area adjacent thereto. Attempts to compromise the electrified fence 1 may occur in these zone breaks.

In an example, the electric fence 10 includes a vertical array of tensioned wires that may be electrified to cover these zone breaks, thereby reducing vulnerable areas of the electrified fence 1. The configuration also helps ensure a continuous flow of electrical current over the entire fence area. Overall, the electric fence 10 fortifies the electrified fence 1 and helps keep individuals from climbing or otherwise traversing the electrified fence 1.

In an example, the electric fence 10 for zone breaks presents itself as a clean and organized assembly of wiring that provides a continuous flow of electrical current. The electric fence 10 for zone breaks may also prevent electrical wiring shorts and false alarms, e.g., caused by wind and debris in inclement weather. The electric fence 10 for zone breaks may do this with tensioned vertical wires that run similar to the horizontal wires. In other words, the way the vertical wires are stretched and tight allows for minimal movement. Therefore, it reduces the opportunity for the wires to set the alarm and it also prevents them from crossing and causing shorts. As such, the electric fence 10 for zone breaks is safe and secure, even in harsh weather. The anti-climb fence is also quick, easy, and inexpensive to install.

Figure 2:
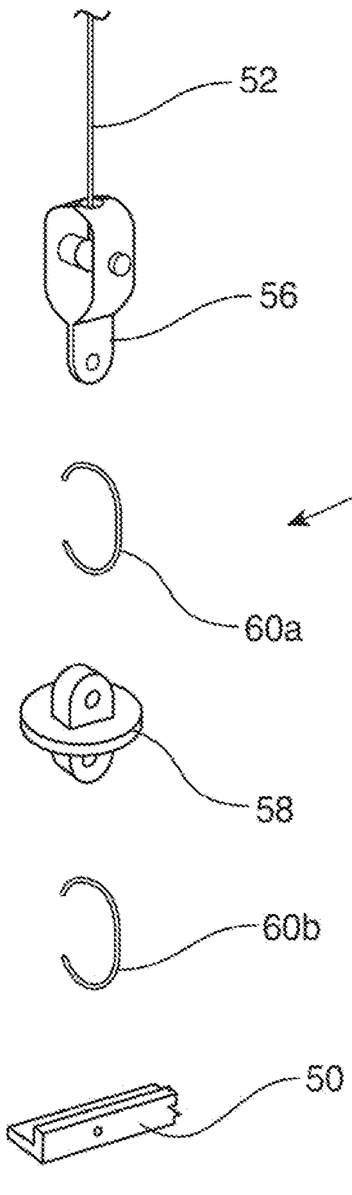
FIG. 2 shows components of the example electric fence for zone breaks.

FIG. 2 shows components of the example electric fence 10 for zone breaks. Example components may include support member(s) 50 and wiring 52 for configuring an array of wires, and one or more connectors 54. Example connectors 54 may include a wire harness 56, an interconnect 58, and clamp(s) 60*a-b*. The clamp 60*a* may connect between the interconnect 58 and the wire harness 56, and the clamp 60*b* may connect between the interconnect 58 and the support member 50. In an example, the wire (or array of wires) electrically connect to the existing electrified horizontal wires (and thus the same AC source), to maintain a continuous flow. In another example, a separate power source may be provided for the electrical wires and/or the electrical wires may be connected to multiple AC sources, e.g., for redundancy.

In an example configuration, the electric fence 10 for zone breaks may include a first support member (e.g., upper support member 12) having at least one attachment 14*a-d*. See, e.g., FIGS. 3A, 4A, and 5A. The electric fence 10 for zone breaks may also include a second support member (e.g., lower support member 16) having at least one corresponding attachment 18*a-d*. At least one wire 20*a-d* may be connected to the at least one attachment 14*a-d*, and the least one corresponding attachment 18*a-d*, respectively. The at least one wire 20*a-d* may extend between the first support member 12 and the second support member 16 to cover the zone break. An electrical connection 22*a-d* provides a connection for electrical current to the at least one wire 20*a-d*.

In an example, the electric fence 10 for zone breaks may include a third support member (e.g., mid support member 24). The mid support member 24 may be provided at any distance between the first support member 12 and the second support member 16. In an example, the mid support member 24 is provided substantially midway between the first support member 12 and the second support member 16. More than one mid support member (not shown) may also be provided. The mid support member 24 has at least one other attachment 26*a-d* and 28*a-d*.

In an example, the electrical connection includes an upper electrical connection and a lower electrical connection. In an example, the electric current may be continuous across both an upper portion 30*a* and a lower portion 30*b* of the electric fence 10 for zone breaks. In another example, the electric current may be split between the upper portion 30*a* and a lower portion 30*b* of the electric fence 10 for zone breaks. Splitting the electric current makes the electric fence 10 for zone breaks more robust. For example, if one portion (e.g., lower portion 30*b*) of the electric fence 10 loses electrical current, electrical current may still be provided to the other portion (e.g., the upper portion 30*a*).

Figure 3A:
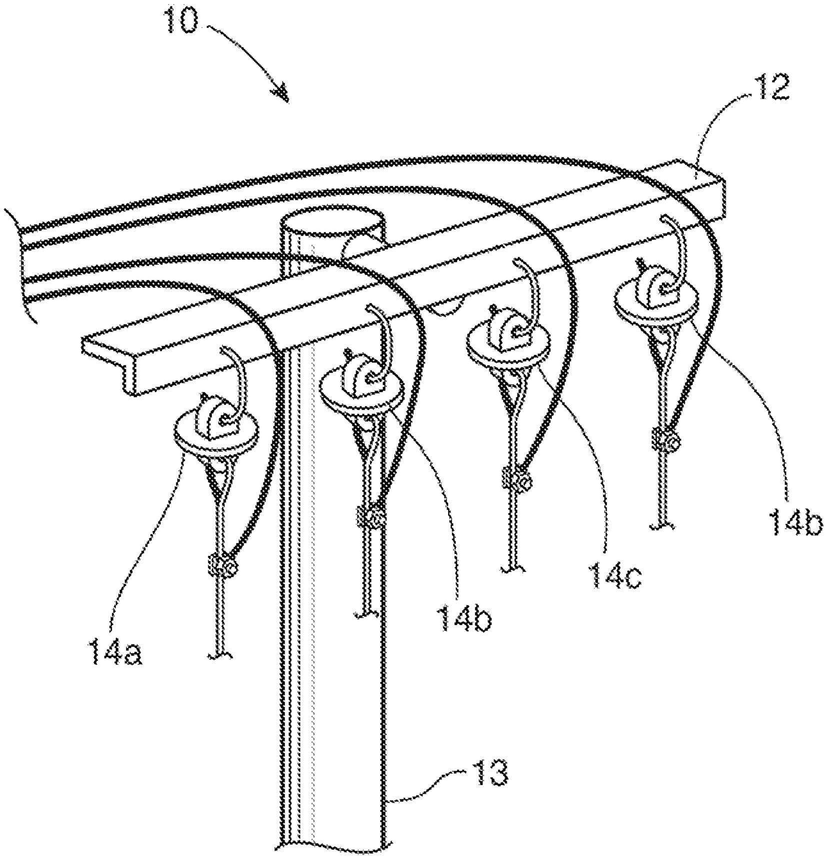
FIGS. 3A-C are perspective views showing A) an upper portion of the example electric fence for zone breaks, B) a mid portion of the electric fence for zone breaks, and C) a lower portion of the example electric fence for zone breaks.
Figure 3B:
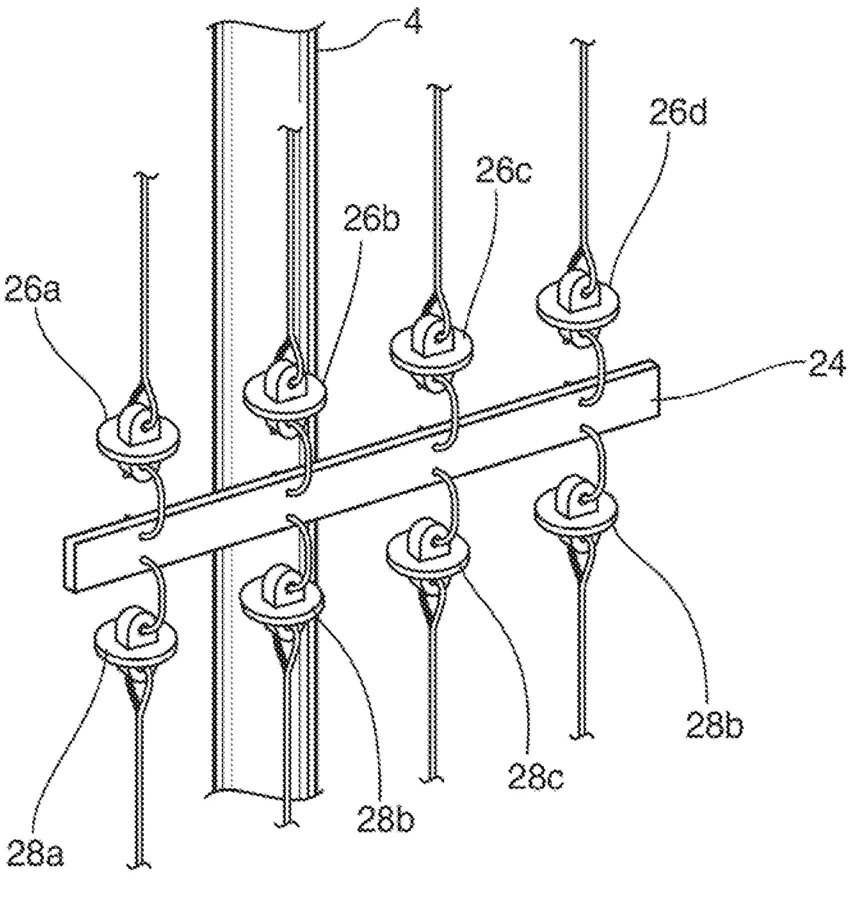
Figure 3C:
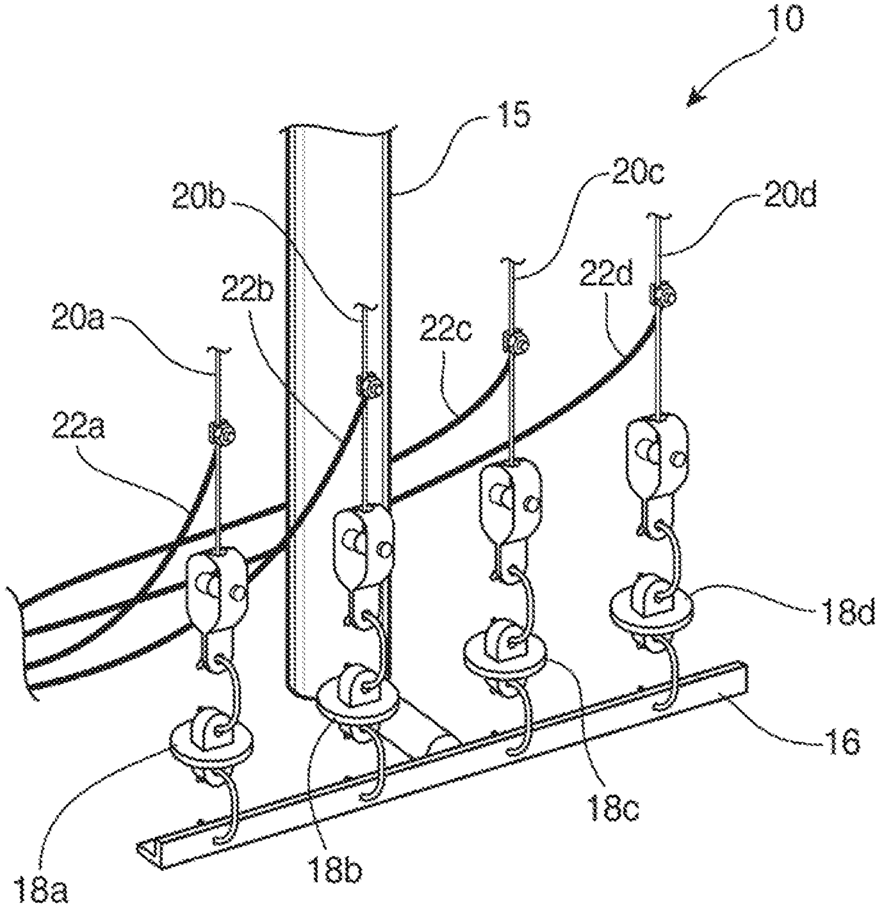
Figure 4A:
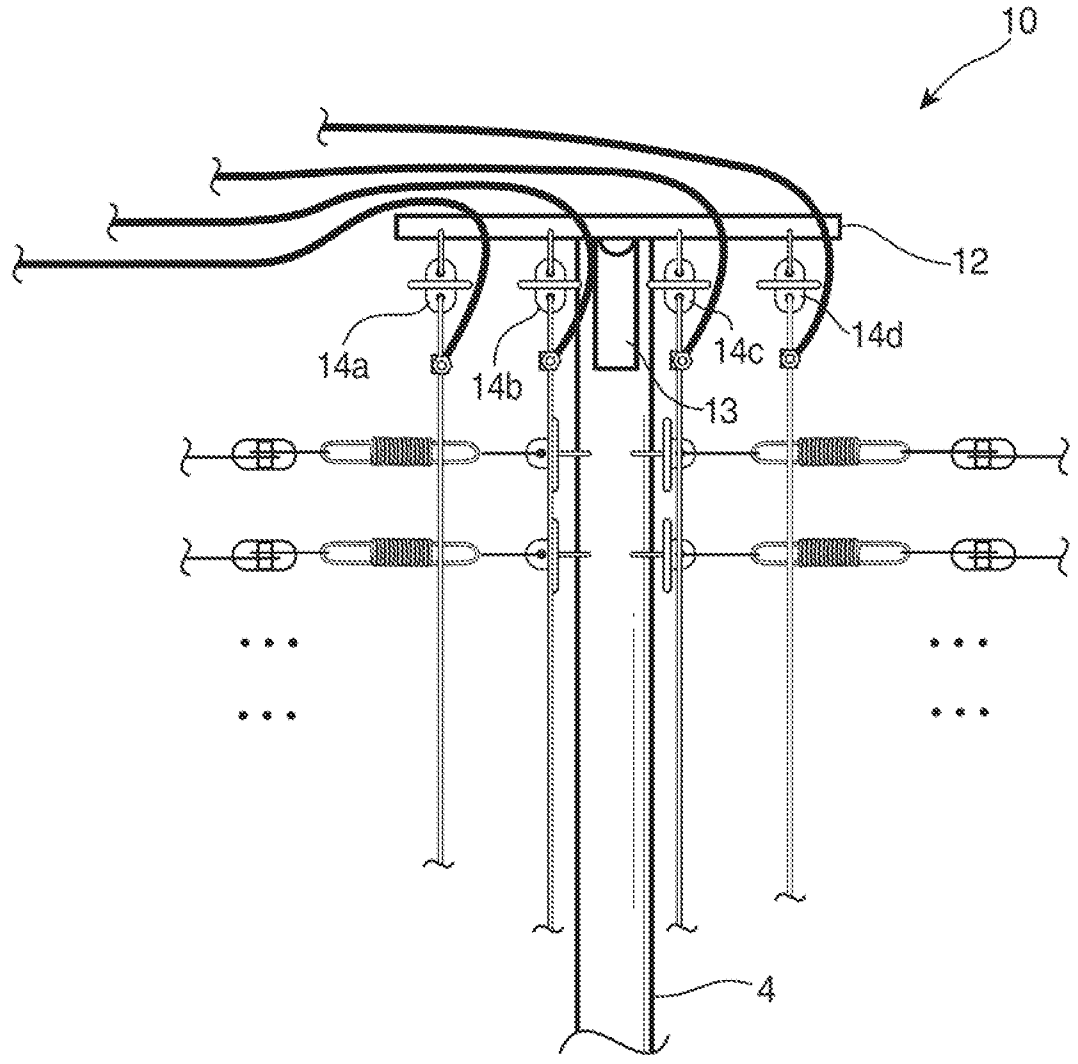
FIGS. 4A-C are plan views showing A) an upper portion of the example electric fence for zone breaks, B) a mid portion of the electric fence for zone breaks, and C) a lower portion of the example electric fence for zone breaks.
Figure 4B:
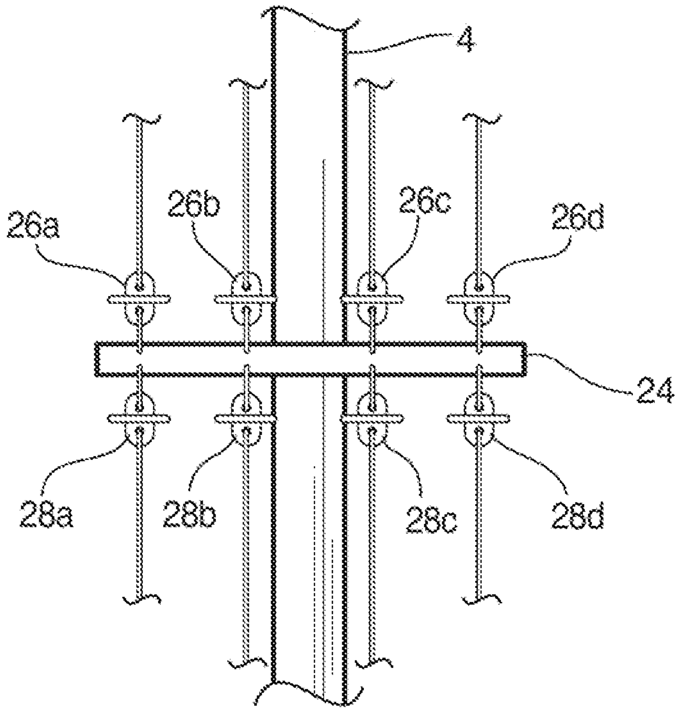
Figure 4C:
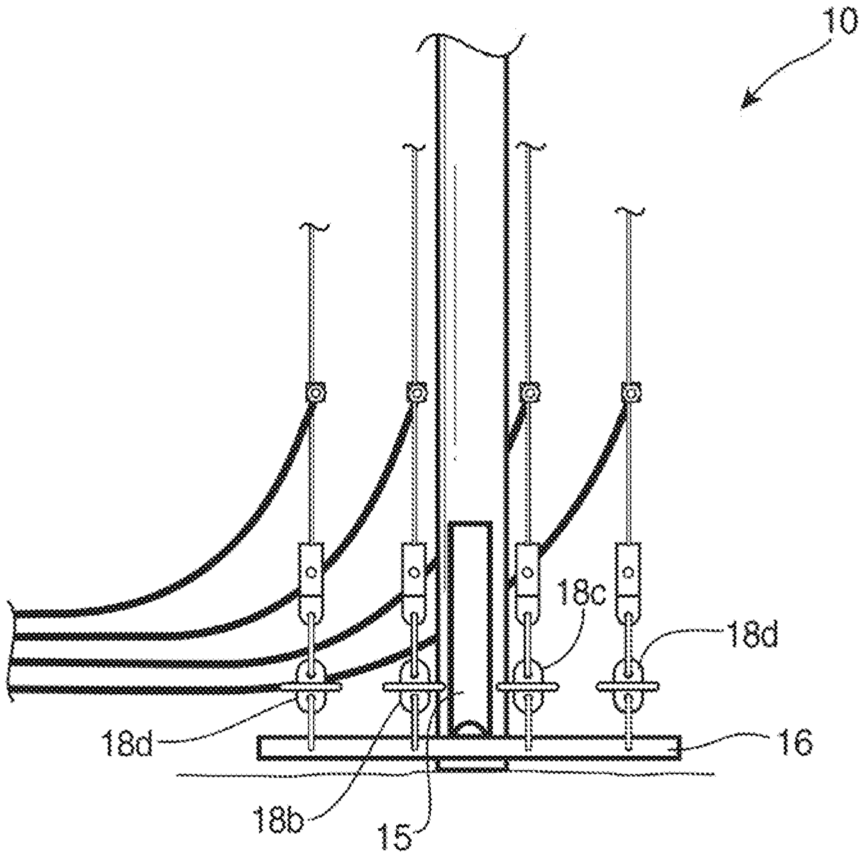
Figure 5A:
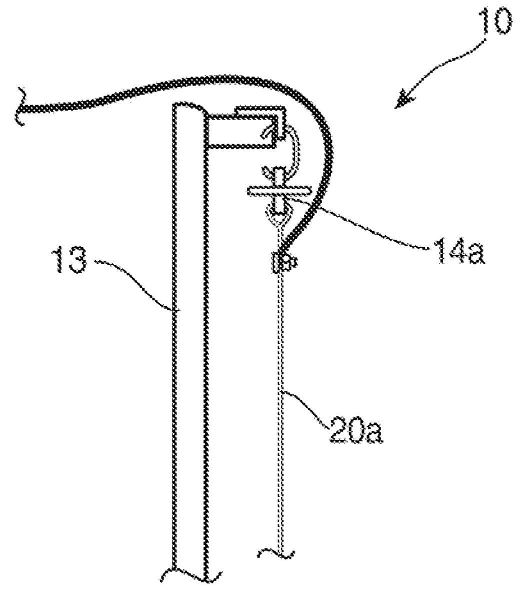
FIGS. 5A-C are side views showing A) an upper portion of the example electric fence for zone breaks, B) a mid portion of the electric fence for zone breaks, and C) a lower portion of the example electric fence for zone breaks.
Figure 5C:
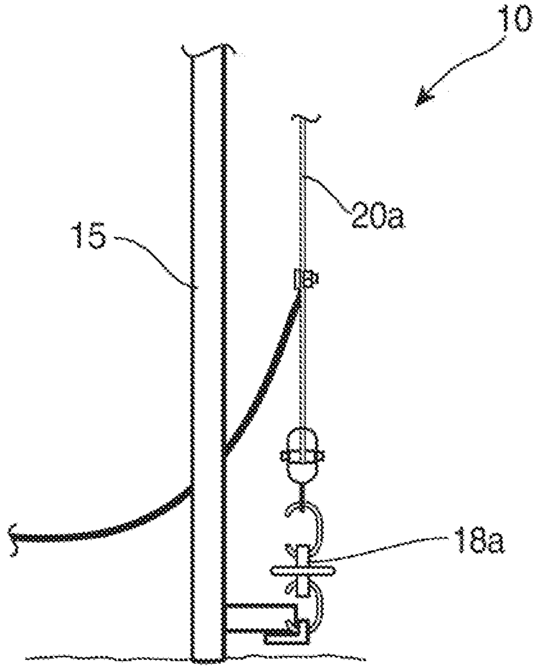
Figure 5B:
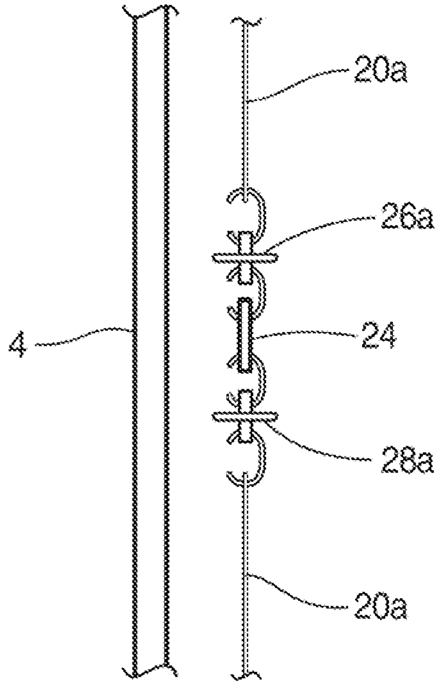

FIGS. 3A-C are perspective views showing A) an upper portion 12 of the example electric fence 10 for zone breaks, B) a mid portion 24 of the electric fence 10 for zone breaks, and C) a lower portion 16 of the example electric fence 10 for zone breaks. FIGS. 4A-C are plan views showing A) an upper portion 12 of the example electric fence 10 for zone breaks, B) a mid portion 24 of the electric fence 10 for zone breaks, and C) a lower portion 16 of the example electric fence 10 for zone breaks. FIGS. 5A-C are side views showing A) an upper portion 12 of the example electric fence 10 for zone breaks, B) a mid portion 24 of the electric fence 10 for zone breaks, and C) a lower portion 16 of the example electric fence 10 for zone breaks.

In an example, the wires may be configured as an array of wires extending between the support members to cover the zone break. In an example, the wire (or array of wires) may be tensioned. Providing the upper attachment 12 to the fence post 4 via an adjustable support post 13, and the lower attachment 16 to the fence post 4 via an adjustable support post 15, enables selective tensioning of the wire (or array of wires). In an example, the adjustable support posts 13 and 15 may be telescoping (e.g., slide up and down and tightened at a desired position) and are mounted to the fence post 4. As such, the wires (or array of wires) may be connected to the attachment(s) and then one or both of the adjustable support posts 13 and 15 adjusted to apply a tension to the wire (or array of wires).

It is noted that the wire (or array of wires) may be stretched in either of the two (or more) zones (e.g., as illustrated in FIG. 3B) or in any single zone (e.g., from top to bottom).

It is noted that the electric fence 10 for zone breaks need not extend from the top of fence post 4 to the ground level. In an example, the electric fence 10 for zone breaks may only be provided near the top portion of the fence post 4. In another example, the electric fence 10 for zone breaks may also be provided to common climb heights (e.g., about 5-10 feet) and not any higher as it is unlikely someone would be able to begin climbing the fence post 4 at heights above 5-10 feet. That is, it would be difficult for someone to jump up five feet and begin climbing the fence post 4 without coming into contact with the electric fence 10 for zone breaks covering the lower five feet of the fence post 4.

While the electric fence 10 for zone breaks is shown as it may be implemented for fence posts 4, the electric fence 10 for zone breaks is not limited to any particular application and may be utilized for other zone breaks. In addition, while the electric fence 10 for zone breaks is shown having a generally vertical configuration, it is not so limited and may take other sizes, shapes, and configurations.

It is noted that the examples shown and described are provided for purposes of illustration and are not intended to be limiting. Still other examples are also contemplated.

The invention claimed is:

1. An electric fence for zone breaks, comprising:

a first support member having at least one attachment, the first support member installed on a fence post of an underlying electric security fence, the first support member having an installed orientation substantially perpendicular to the fence post of the underlying electric security fence and substantially parallel to a cross wire extending between adjacent posts of the underlying security fence;

a second support member installed on the fence post and having at least one corresponding attachment, the second support member oriented substantially parallel to the first support member;

at least one wire connected to the at least one attachment and the at least one corresponding attachment, the at least one wire extending between the first support member and the second support member to cover a zone break, wherein the at least one wire extends substantially perpendicular the first support member and the second support member; and an electrical connection to provide electrical current to the at least one wire.

2. The electric fence for zone breaks of claim 1, further comprising a third support member having at least one other attachment, the third support member oriented substantially parallel to the first support member, wherein one of the first, second, and third support members is a mid-point attachment.

3. The electric fence for zone breaks of claim 1, further comprising an array of wires extending between the first support member and the second support member to cover the zone break, the wires extending substantially perpendicular to the first and second support members.

4. The electric fence for zone breaks of claim 1, wherein the at least one wire is tensioned.

5. The electric fence for zone breaks of claim 1, wherein the electrical connection includes an upper electrical connection and a lower electrical connection.

6. The electric fence for zone breaks of claim 1, wherein a zone break is adjacent the fence post.

7. The electric fence for zone breaks of claim 1, wherein the at least one wire protects non-electrified portions of the underlying electric security fence, the at least one wire reducing compromising the underlying electric security fence at vulnerable portions.

8. The electric fence for zone breaks of claim 1, wherein the at least one wire provides a continuous flow of electrical current.

9. The electric fence for zone breaks of claim 1, wherein the at least one wire prevents electrical shorts and false alarms by preventing wires of the electric fence from crossing and causing shorts.

10. An electric fence with protection for a zone break, comprising:

adjacent support members installed on a fence post of an underlying electric security fence;

an array of wires extending between the adjacent support members to protect the zone break; and an electrical connection to provide electrical current to the array of wires;

wherein the adjacent support members have an orientation substantially parallel to at least one cross wire extending between adjacent posts of the underlying electric security fence.

11. The electric fence of claim 10, further comprising a mid-point attachment for the array of wires.

12. The electric fence of claim 10, wherein the array of wires is tensioned between the adjacent support members.

13. The electric fence of claim 10, wherein the electrical connection has an upper electrical connection and a lower electrical connection.

14. The electric fence of claim 10, wherein the zone break is adjacent a fence post.

15. The electric fence of claim 10, wherein the array of wires provides a continuous flow of electrical current adjacent the zone break.

16. A method to protect a zone break in an electric fence, comprising:

installing adjacent support members on a fence post of an underlying electric security fence in an orientation substantially perpendicular to the fence post and substantially parallel to a cross wire extending between adjacent posts of the underlying electric security fence;

extending an array of wires between the adjacent support members to protect the zone break, the array of wires extended substantially perpendicular to the adjacent support members; and providing a connection from the array of wires to an electrical current.

17. The method of claim 16, further comprising providing a mid-point attachment for the array of wires.

18. The method of claim 16, further comprising tensioning the array of wires.

19. The method of claim 16, further comprising providing a continuous flow of electrical current adjacent the zone break.

20. The method of claim 16, further comprising electrifying the array of wires to protect a zone break formed at the fence post of the electric fence.

* * * * *